(12) United States Patent
Xu et al.

(10) Patent No.: US 8,057,554 B2
(45) Date of Patent: Nov. 15, 2011

(54) BATTERY SPACER

(75) Inventors: Jiaolian Xu, Shenzhen (CN); Feng Luo, Shenzhen (CN); Juan Zhang, Shenzhen (CN)

(73) Assignee: BYD Company Limited (CN)

( * ) Notice: Subject to any disclaimer, the term of this patent is extended or adjusted under 35 U.S.C. 154(b) by 75 days.

(21) Appl. No.: 12/247,111

(22) Filed: Oct. 7, 2008

(65) Prior Publication Data

US 2009/0136836 A1     May 28, 2009

(30) Foreign Application Priority Data

Nov. 24, 2007    (CN) .................. 2007 2 0171212 U

(51) Int. Cl.
*H01M 6/02* (2006.01)
*H01M 2/14* (2006.01)
*H01M 2/26* (2006.01)
*H01M 4/13* (2006.01)

(52) U.S. Cl. ........ 29/623.1; 429/131; 429/161; 429/211

(58) Field of Classification Search .................. 429/131, 429/96, 100, 121, 152, 94, 211, 161; 29/623.5, 29/623.1
See application file for complete search history.

(56) References Cited

U.S. PATENT DOCUMENTS

| | | | | |
|---|---|---|---|---|
| 2,981,780 A | * | 4/1961 | Burnette, Jr. ..................... | 429/94 |
| 4,105,831 A | * | 8/1978 | Plasse .............................. | 429/86 |
| 5,032,475 A | * | 7/1991 | Hasebe et al. ................... | 429/60 |
| 5,354,629 A | * | 10/1994 | Kuroda et al. .................. | 429/94 |
| 5,796,588 A | | 8/1998 | Machida | |
| 7,129,001 B2 | | 10/2006 | Munenaga et al. | |
| 2006/0088761 A1 | | 4/2006 | Ota | |
| 2009/0108808 A1 | | 4/2009 | Hemmer et al. | |
| 2009/0142659 A1 | | 6/2009 | Lai et al. | |
| 2009/0142661 A1 | | 6/2009 | Xiang et al. | |

FOREIGN PATENT DOCUMENTS

| | | |
|---|---|---|
| CN | 1304559 | 7/2001 |
| CN | 2829107 | 10/2006 |
| CN | 101075667 | 11/2007 |
| CN | 201122609 | 9/2008 |
| CN | 201122624 | 9/2008 |
| CN | 101425678 | 5/2009 |
| DE | 10100626 | 8/2001 |
| JP | 56167267 | 12/1981 |
| JP | 59121778 | 7/1984 |
| JP | 09103034 | 4/1997 |
| JP | 11025993 A * | 1/1999 |

OTHER PUBLICATIONS

Machine translation of JP 11025993 A, Yamauchi, Yasuhiro, Jan. 1999.*
Bayho Product Sheet, "Motorola V200 Slim Lithium Battery".*
European Search Report for EP08400053 (mailed Apr. 3, 2009).

* cited by examiner

*Primary Examiner* — Jonathan Crepeau
*Assistant Examiner* — Kenneth Douyette
(74) *Attorney, Agent, or Firm* — Greenberg Traurig, LLP

(57) ABSTRACT

Described is a lithium-ion battery spacer having a spacer board with two operably coupled apertures disposed therethrough. The operably coupled apertures can be tapered to further facilitate smooth passage of a cathode or anode tab therethrough and secure such tab thereby minimizing tilting or shorting of the tab. Accordingly, the spacer leads to safer and more efficient production of the lithium-ion battery.

9 Claims, 4 Drawing Sheets

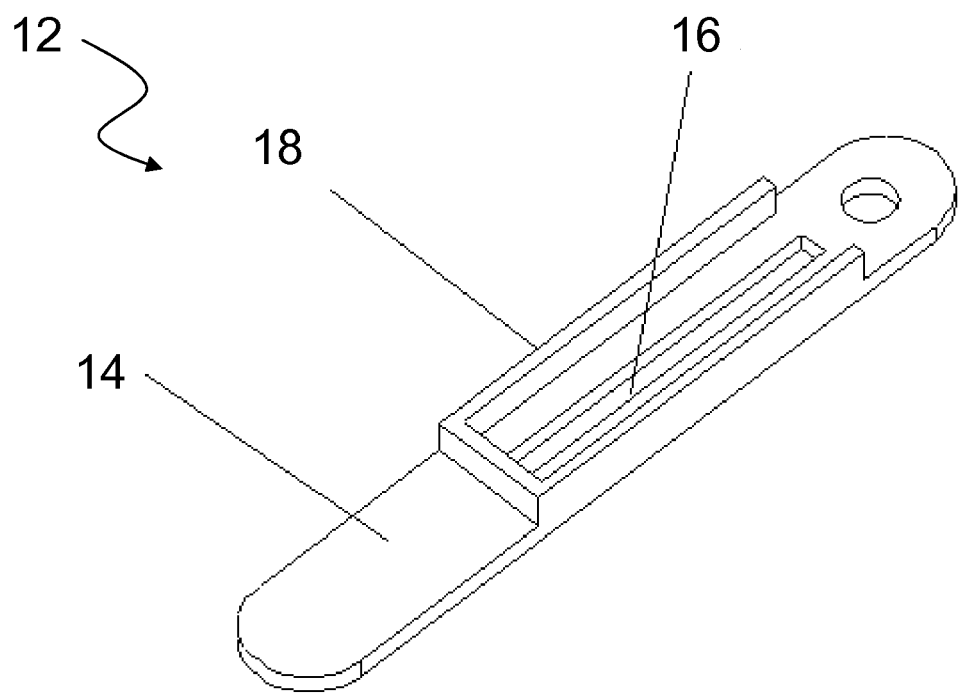
FIG. 1 (prior-art)
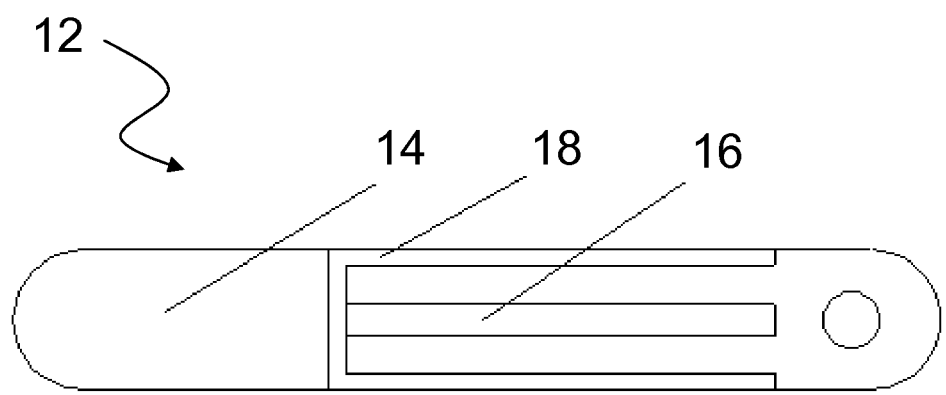
FIG. 2 (prior-art)

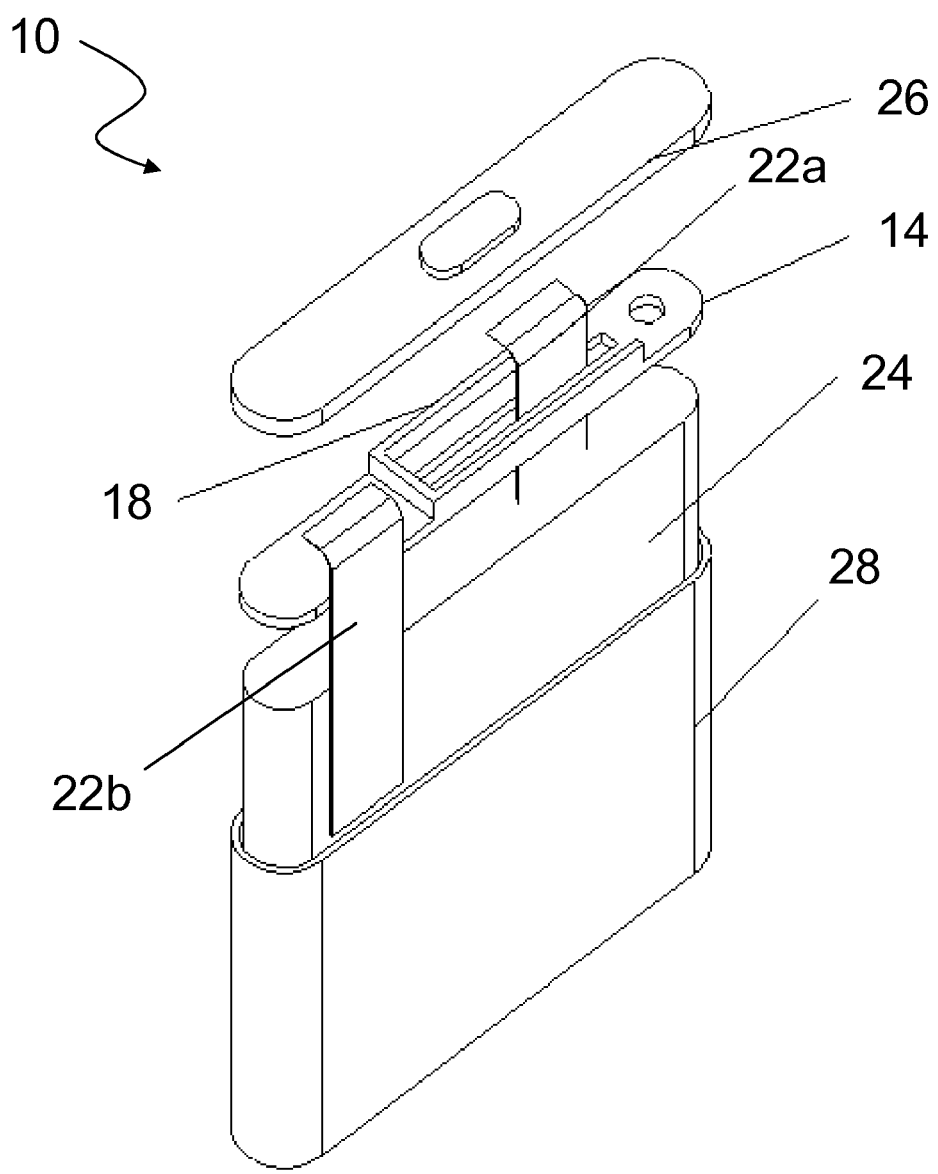
FIG. 3 (prior-art)

BATTERY SPACER

CROSS-REFERENCE TO PRIOR APPLICATIONS

This application claims priority to Chinese Patent Application No. 200720171212.1, filed Nov. 24, 2007.

FIELD OF THE INVENTION

The embodiments of the present invention relate to battery spacers.

BACKGROUND

Batteries with high energy and efficiency driven by chemical reactions have been employed in mobile communications, camcorders, cameras, portable instruments and other related devices. In addition, studies have focused on using such batteries to power electric vehicles and conduct space exploration, with batteries becoming the preferred alternative energy source. As such, the demand for high performing secondary batteries is on the rise.

Generally, the assembly process for a square-shaped lithium-ion battery involves: (1) providing a battery core; (2) coupling cathode and anode tabs from the battery core through apertures on a spacer board with the tabs being separated by a ledge; (3) securing the spacer board to the top of the battery core; (4) inserting the battery core within a battery shell; and (5) sealing the battery core and the battery shell with a battery cover. The spacer board separates the cover from the core ensuring that the two does not make physical contact thus minimizing potential shorts and improving battery safety.

Reference is now made to FIGS. 1-3 illustrating a prior-art battery 10 having a core 24 housed within a shell 28 and capped with a cover 26. The battery 10 further includes a spacer 12 having a board 14 with a generally rectangular aperture 16 disposed therethrough. The spacer board 14 can be configured to receive and secure a cathode or anode tab 22a through the aperture 16 while the other tab 22b can be coupled to another part of the spacer board 14. A ledge 18 may be employed to prevent shorting of the tabs 22a, 22b. However, if the aperture 16 is too wide, the tab 22a may tilt or move about while situated within the aperture 16. In some instances, the tabs 22a, 22b may come into contact with each other thus causing electrical shorts and safety concerns. Conversely, if the aperture 16 is too narrow, it may be difficult and time consuming to insert the tab 22a therethrough thus lowering productivity and efficiency of the manufacturing process.

As such, there exists a need for a spacer that facilitates the assembly process for a lithium-ion battery.

SUMMARY

Accordingly, a first embodiment of the present invention discloses a lithium-ion battery spacer comprising: a spacer board having first and second apertures disposed therethrough, the first aperture configured to receive a battery tab and the second aperture adaptable to secure the battery tab; and wherein the apertures are operably coupled to each other. The first aperture is rectangular and has a width greater than 0.4 mm but less than the width of the spacer board. The second aperture is also rectangular and has a width greater than the thickness of the battery tab by about 0.05 mm to 0.15 mm. The operably coupled apertures are tapered to facilitate smooth movement of the battery tab from the first aperture to the second aperture, and vice versa.

A second embodiment of the present invention discloses a lithium-ion battery comprising: a battery shell configured to receive a battery core and a battery spacer, the battery shell adaptable to being secured by a battery cover; wherein the battery spacer includes a spacer board having first and second apertures operably coupled to each other and disposed therethrough; and at least one battery tab coupled to the battery core and the battery cover, wherein the battery tab can be received by the first aperture and secured by the second aperture, and wherein the battery tab can be cathode or anode. The first aperture is rectangular and has a width greater than 0.4 mm but less than the width of the spacer board while the second aperture is rectangular and has a width greater than the thickness of the battery tab by about 0.05 mm to 0.15 mm. The operably coupled apertures are tapered to facilitate smooth movement of the battery tab from the first aperture to the second aperture, and vice versa. The battery can further include a ledge for separating cathode and anode battery tabs. In addition, the battery tabs can be further secured with tape.

Other variations, embodiments and features of the present invention will become evident from the following detailed description, drawings and claims.

BRIEF DESCRIPTION OF THE DRAWINGS

FIGS. 1-2 illustrate perspective and top-down views, respectively, of a prior-art battery spacer;

FIG. 3 illustrates a perspective view of a battery utilizing the prior-art battery spacer;

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 4:
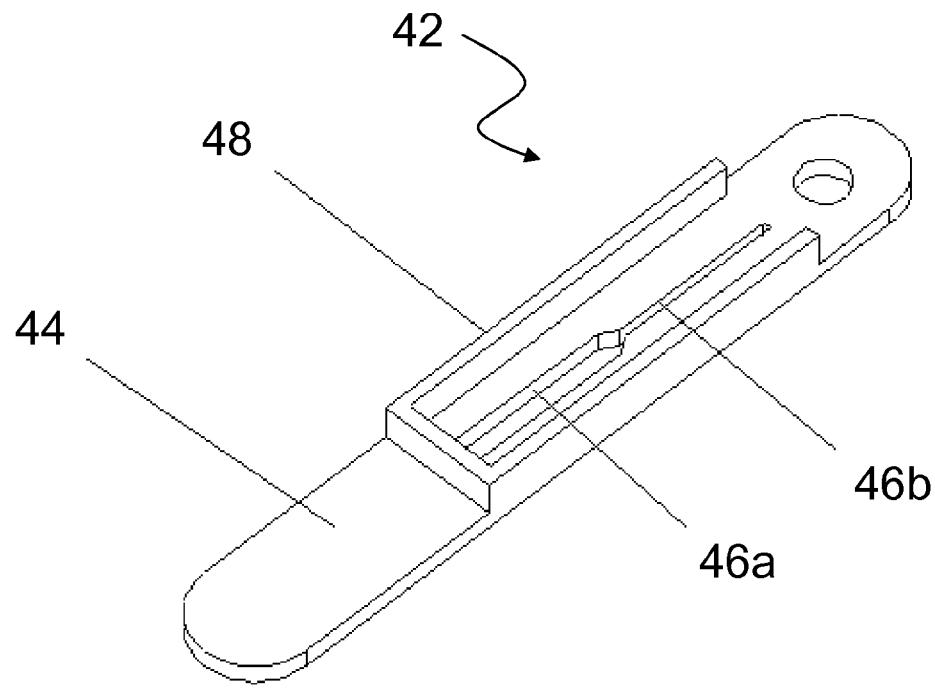
FIGS. 4-5 illustrate perspective and top-down views, respectively, of an embodiment of a battery spacer according to the present invention.
Figure 5:
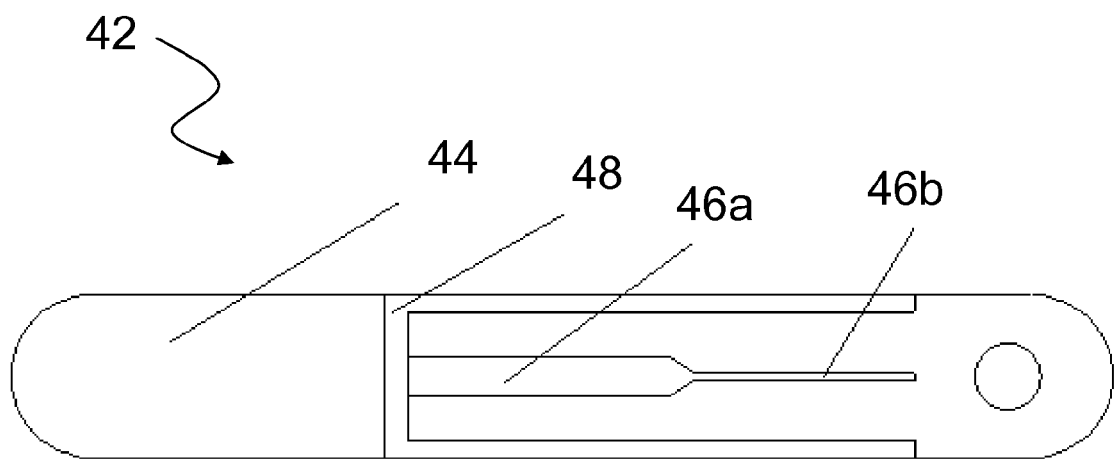
Figure 6:
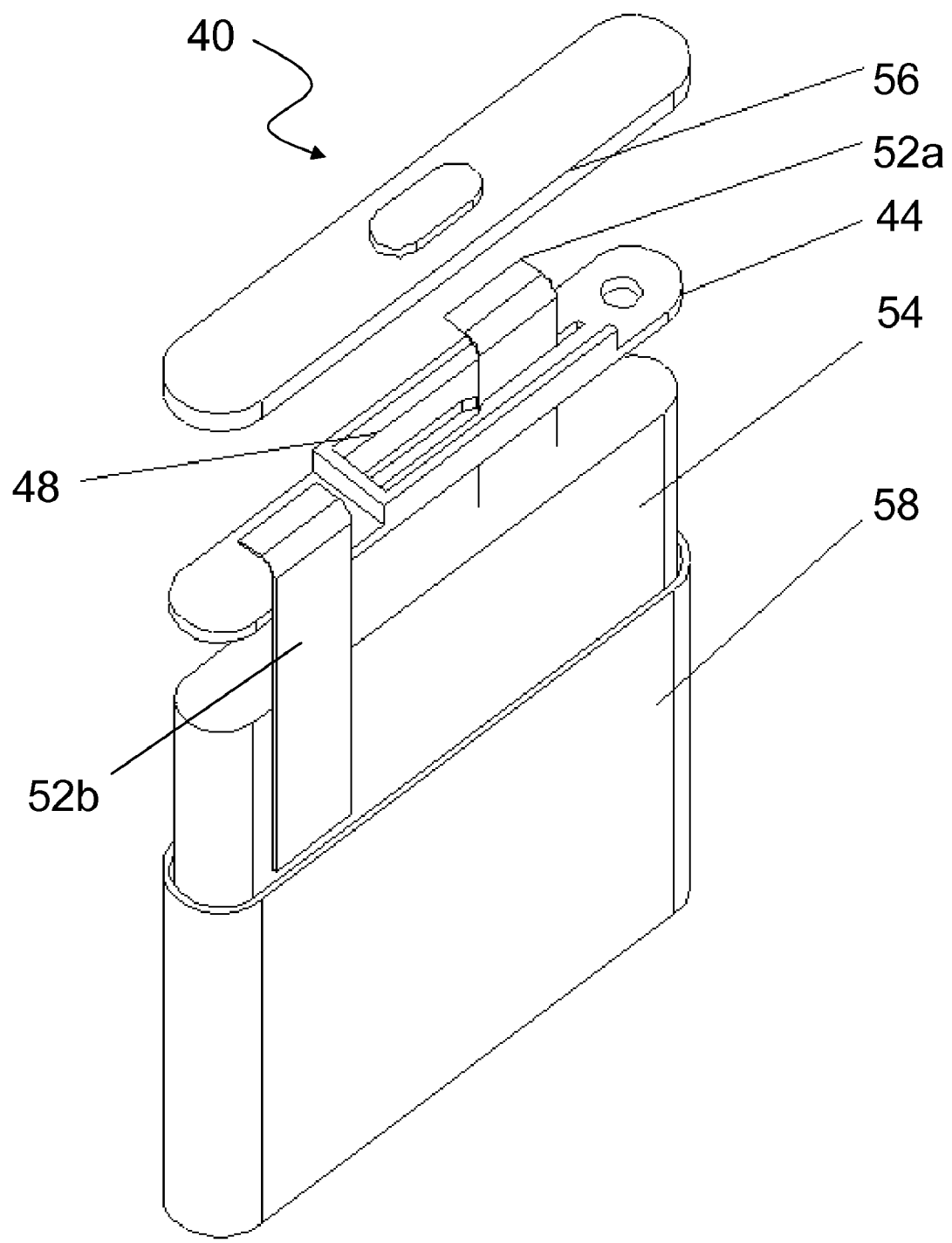
FIG. 6 illustrates a perspective view of a battery utilizing the battery spacer of FIGS. 4-5.

Reference is now made to FIGS. 4-6 illustrating an embodiment of a battery 40 having a core 54 housed within a shell 58 and capped with a cover 56. The battery 40 further includes a spacer 42 having a board 44 with two interconnected apertures 46a, 46b disposed therethrough. In one embodiment, a larger aperture 46a is designed to receive a cathode or anode tab 52a while a smaller aperture 46b is designed to secure the tab 52a. In one embodiment, the apertures 46a, 46b are tapered to provide a smooth transition of a tab 52a moving about between the two apertures 46a, 46b. This will become more apparent in subsequent discussion. The battery 40 further includes another anode or cathode tab 52b, which can be coupled to another part of the spacer board 44. A ledge 48 may be employed to prevent shorting of the tabs 52a, 52b.

As shown in the figures, the board 44 of the spacer 42 includes a larger aperture 46a with a substantial width for receiving a cathode or anode tab 52a. Once received by the aperture 46a, the tab 52a may subsequently be secured within the smaller aperture 46b by operably sliding the tab 52a from the larger aperture 46a into the smaller aperture 46b as best shown in FIG. 6. Although both apertures 46a, 46b are rectangular in shape, it is understood that the apertures 46a, 46b can take on other polygonal shapes including trapezoidal or interconnectedly tapered. In this instance, the apertures 46a, 46b are tapered to provide smooth movement of the tab 52a between them. Furthermore, because the tab 52a can be securely situated within the smaller and narrower aperture 46b, the chance of shorting becomes minimized. Also, a generally C-shaped ledge 48 may be disposed about the edges of the board 44 to further insulate and separate the tabs 52a, 52b. Although not shown, the board 44 may also include a plurality of holes for injecting electrolytes and other fluids into the battery core 54.

In general, the larger rectangular aperture 46a is longer than the width of the tab 52a and wider than the thickness of the tab 52a to facilitate the ease of receiving the tab 52a within the aperture 46a. In one example, the width of the aperture 46a is greater than 0.4 mm but smaller than the width of the board 44 having a width of about 0.4 mm to 0.6 mm.

The smaller rectangular aperture 46b is longer than the width of the tab 52a and wider than the thickness of the tab 52b by about 0.05 mm to 0.15 mm. The apertures 46a, 46b are interconnected and operably coupled to each other to facilitate movement of the tab 52a from the larger aperture 46a to the smaller aperture 46b, and vice versa.

The spacer board 44 can be formed of polypropylene (PP), polyethylene terephthalate (PET), perfluoroalkoxy (PFA), polyphenylene sulfide (PPS) and other suitable plastic or polymeric materials. In one embodiment, the board 44 has a width of about 3 mm to 10 mm, a thickness of about 0.4 mm to 3 mm and a length of about 10 mm to 50 mm.

As discussed above, a lithium-ion battery 40 also includes a spacer 42, cover 56, shell 58 and core 54. The core 54 and the spacer 42 may be situated within the shell 58 as best illustrated in FIG. 6, wherein cathode and anode tabs 52a, 52b extend from the core 54 of the battery 40. One of the tabs 52a may be secured by the smaller aperture 46b while the other tab 52b may be coupled to another part of the board 44 of the spacer 42. Once the tabs 52a, 52b are secured, electrical contacts are made with the cover 56, which is accordingly sealed within the battery shell 58.

The battery core 54 may further include a central core and non-aqueous electrolytes, the central core including cathode, anode and separating films in stacked, cascading or rolled formation. In one instance, the cathode and anode films can be coupled to their respective cathode and anode tabs 52. The cathode component further includes a cathode collector and cathode materials disposed about the collector, the cathode materials including cathode active materials, adhesives, additives and binder components. The anode component also includes an anode collector and anode materials disposed about the collector, the anode materials including anode active materials, adhesives, additives and binder components.

The cathode active material may include one or more compounds with the following chemical formulas: $Li_xNi_{1-y}CoO_2$, wherein $0.9 \leq x \leq 1.1$ and $0 \leq y \leq 1.0$; $Li_{1+a}M_bMn_{2-b}O_4$, wherein $-0.1 \leq a \leq 0.2$, $0 \leq b \leq 1.0$, and M being lithium, boron, magnesium, aluminum, titanium, chromium, iron, cobalt, nickel, copper, zinc, gallium, yttrium, fluorine, iodine or sulfur; $Li_mMn_{2-n}B_nO_2$, wherein B being a transition metal, $0.9 \leq m \leq 1.1$ and $0 \leq n \leq 1.0$. Additionally, lithium cobalt oxygen, lithium nickel oxygen, lithium manganese oxygen, lithium nickel cobalt oxygen, lithium nickel manganese oxygen, and lithium nickel manganese cobalt oxygen may be utilized. The anode active material can include one or more of the following: natural graphite, artificial graphite, petroleum coke, decomposition of organic carbon, carbon microspheres, carbon fiber, tin and silicon alloy. The cathode and anode active materials may also include other materials known by one skilled in the art.

A binder material may be used with the cathode material including those used in lithium-ion batteries. For example, the binder material can include one or more of the following: fluorinated resin, acrylic polymer, amine polymer, polyolefin compounds, polyvinylidene fluoride, PTFE, P(VDF-HFP), polyamide-imide and SBR. The amount of binder material to be used with the cathode active material may be about 0.1 to 10% relative to the weight of the cathode active material. However, the amount and concentration of the binder material may be adjusted accordingly. In addition, the film covering the cathode active material can utilize the same adhesive as that of the binder material described above, but the adhesive for the film need not be the same as that of the binder material for the cathode active material.

Likewise, a binder material may be used with the anode material including those used in lithium-ion batteries. For example, the binder material can be a water soluble solvent or styrene butadiene rubber. The amount and concentration of the binder material to be used with the anode active material is relative to the weight of the anode active material, wherein the amount of binder compound is about 0.1% to 10% of the weight of the cathode active material. However, the amount and concentration of the binder material may be adjusted accordingly. In addition, the anode active material may further include additives known by those skilled in the art, the additives being without limitation one or more of the following: carboxymethyl cellulose (CMC), hydroxypropyl methyl cellulose (HPMC), methyl cellulose (MC), hydroxypropyl cellulose (HPC) and carboxymethyl hydroxyethyl cellulose (CMHEC).

In general, the amount of adhesives to be used with the anode active material is about 0.1% to 5% relative to the weight of the anode active material. However, the amount and concentration of the adhesives may be adjusted accordingly. Additionally, the film covering the anode active material can utilize the same additives as those described above and at about 0.1% to 5% relative to the weight of the anode active material, but the additives for the film need not be the same as that of the additives for the anode active material.

The cathode collector of the lithium-ion battery is similar to conventional cathode collectors including without limitation aluminum foil, copper foil and nickel strips, the cathode collector capable of extending from the neck of the cathode fluid. The anode collector of the lithium-ion battery is similar to conventional anode collectors including without limitation stamped metal, metal foil, metal mesh and bubble-shaped metal, the anode collector capable of extending from the neck of the anode fluid.

The battery can further include separators having the ability to insulate and maintain the performance of cathode and anode fluids. The nature and types of separators may be those utilized for lithium-ion batteries including without limitation polyolefin micro-porous membrane, polyethylene felt, glass fiber felt or ultra-fine glass fiber felt.

The electrolytic solutions include a mixture of lithium salt electrolyte and non-aqueous organic solvent or other solutions. For example, the lithium salt electrolyte may include one or more of the following: lithium hexafluoro phosphate ($LiPF_6$), lithium perchlorate, lithium tetrafluoroborate, lithium hexafluoro arsenate, halogenated lithium, lithium chloroaluminate and lithium fluoride alkylation acid. Likewise, the organic solvent may include a mixture of chain ester and ester ring solutions, with the chain ester being dimethyl carbonate (DMC), diethyl carbonate (DEC), ethyl methyl carbonate (EMC), methyl propyl carbonate (MPC), dipropyl carbonate (DPC) and other chain esters containing fluoride, sulfur and unsaturated organic chain esters. The ester ring includes ethylene carbonate (EC), propylene carbonate (PC), vinylene carbonate (VC), γ-butyrolactone (γ-BL), methyl lactone and other ester ring containing fluoride, sulfur and unsaturated organic ester rings. The amount of electrolyte injected can be from about 1.5 to 4.9 g/Ah while the concentration can be from about 0.5 to 2.9 mol/L.

For slurry coating, conventional methods can be employed including those used in preparing cathode active material for lithium-ion batteries. The thickness of the slurry can be about 5 to 30 microns based on the thickness of the slurry after the film has been dried. Other heating or drying techniques may be utilized to remove the solvent from the slurry. For example, the slurry may be heated from about 70 to 200° C. for about 1 to 20 minutes. Subsequently, the slurry may be pressure rolled after drying using methods known by those skilled in the art.

The application of the cathode active material and binder component to the lithium-ion cathode battery can utilize known techniques. For example, the cathode active material and the binder component may be dissolved in an electrolytic solvent to produce the cathode slurry, which can subsequently be applied to the lithium-ion cathode battery and dried, with or without pressure roll. Within the cathode slurry, relative to the weight of the cathode active material, the amount of binder component can be about 0.5 to 8 weight percent while the amount of electrolytic solvent has about 30 to 90 weight percent. Additionally, the amount of adhesives and the method of its application to the cathode active material can employ the same or similar techniques as described above.

The application of anode active material and binder component to the lithium-ion anode battery can utilize known techniques. For example, the anode active material and the binder compound may be dissolved in an electrolytic solvent to produce the anode slurry, which can subsequently be applied to the lithium-ion anode battery and dried, with or without pressure roll. Within the anode slurry, relative to the weight of the anode active material, the amount of binder compound can be about 0.01 to 8 weight percent while the amount of electrolytic solvent has about 30 to 90 weight percent. Additionally, the amount of adhesives and the method of its application to the anode active material can employ the same or similar techniques as described above.

Additives including conductive agents may be further added to the cathode slurry, the conductive agent being one or more of the following: acetylene black, conductive carbon black, conductive graphite and other conductive agents known by one skilled in the art. Within the cathode slurry, relative to the weight of the cathode active material, the amount of conductive agent can be about 1 to 15 weight percent.

Likewise, conductive agents may also be added to the anode slurry, the conductive additive being one or more of the following: carbon black, nickel powder, copper powder and other conductive agents known by one skilled in the art. Within the anode slurry, relative to the weight of the anode active material, the amount of conductive agent can be about 0 to 15 weight percent.

The cathode tab for the lithium-ion battery can include aluminum and nickel cathode tabs with thicknesses of 0.07 mm. To improve stability and prevent shorting of the tabs, the cathode tab may be coupled with two layers of about 0.04 mm thick adhesives such that the total thickness of the cathode tab is about 0.15 mm. In other instances, other known cathode tabs known by those skilled in the art may be utilized.

In coupling the spacer board 44 to the top of the battery core 54, tapes or adhesives (not shown) may be utilized. In one instance, the rear of the battery core 54 faces the ledge 48 that extends from the top of the spacer board 44. The battery shell 58 may be square-shaped and fabricated of steel or aluminum material. When the shell 58 is aluminum, the cathode tab 52b extends from the outer battery core 54 and makes contact with a portion of the spacer board 44 while the anode tab 52a extends from the inner battery core 54, through the apertures 46a, 46b, and connects with the battery cover 56 via rivets. When the shell 58 is steel, the anode tab 52b extends from the outer battery core 54 and makes contact with a portion of the spacer board 44 while the cathode tab 52a extends from the inner battery core 54, through the apertures 46a, 46b, and connects with the battery cover 56 via rivets. The coupling methods may also utilize other techniques as known by one skilled in the art such as welding. In addition, positioning of the battery core 54 and the spacer board 44 within the battery shell 58, and sealing of the battery cover 56 to that of the battery shell 58 may utilize known methods including ultrasonic welding.

The presently disclosed embodiments allow a battery tab 52a, whether cathode or anode, to extend from the battery core 54, pass through the spacer board 44 and make contact with the cover 56. In passing through the spacer board 44, the tab 52a can first be readily received by the wider aperture 46a without any difficulty. Once received, the tab 52a can subsequently be secured by sliding it from the wider aperture 46a to the operably coupled narrower aperture 46b. Because of the tapering between the apertures 46a, 46b, the tab 52a is able to smoothly move about between the two apertures 46a, 46b. Furthermore, because of its limited width, the narrower aperture 46b is able to maintain the tab 52a in a fixed or locked position thereby minimizing tilting of the tab 52a and avoiding shorting of the tabs 52a and increasing the safety of the battery.

Although the invention has been described in detail with reference to several embodiments, additional variations and modifications exist within the scope and spirit of the invention as described and defined in the following claims.

What is claimed is:

1. A method comprising:
   providing a battery spacer board,
      the battery spacer board comprising:
         a first solid portion; and
         a second portion consisting essentially of:
            a single aperture having:
               a first aperture portion and a second aperture portion, the first aperture portion having a first width and the second aperture portion having a second width, wherein the first width is greater than the second width;
   receiving a first battery tab against the first solid portion;
   receiving a second battery tab through the first aperture; and
   securing the second battery tab in the second aperture by:
      sliding the first battery tab along at least a portion of the first solid portion and
      sliding the second battery tab from the first aperture portion into the second aperture portion.

2. The method of claim 1, wherein the first aperture portion is rectangular and has a first width greater than 0.4 mm but less than the width of the spacer board.

3. The method of claim 1, wherein the second aperture portion is rectangular and has a second width greater than the thickness of the battery tab by about 0.05 mm to 0.15 mm.

4. The method of claim 2, wherein the second aperture portion is rectangular and has a second width greater than the thickness of the battery tab by about 0.05 mm to 0.15 mm, wherein the first width is greater than the second width.

5. The method of claim 1, wherein the first solid portion of the board has a top surface, a bottom surface, and a perimeter, and wherein the first tab is received by at least the perimeter of the first solid portion of the board.

6. The method of claim 1, wherein the first aperture portion and a second aperture portion are tapered to facilitate sliding the battery tab from the first aperture portion to the second aperture portion.

7. The method of claim 1, wherein the second portion includes a ledge.

8. The method of claim 1, wherein the first tab is a cathode and the second tab is an anode.

9. The method of claim 1, wherein the first and second battery tabs are further secured with tape.

* * * * *